(12) United States Patent
Sumiya et al.

(10) Patent No.: US 10,233,803 B2
(45) Date of Patent: Mar. 19, 2019

(54) EXHAUST GAS PURIFICATION FILTER

(71) Applicant: Johnson Matthey Public Limited Company, London (GB)

(72) Inventors: Satoshi Sumiya, Sakura (JP); Daisuke Yokota, Sakura (JP)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/473,007

(22) Filed: Mar. 29, 2017

(65) Prior Publication Data

US 2017/0284247 A1    Oct. 5, 2017

(30) Foreign Application Priority Data

Apr. 1, 2016   (JP) ................. 2016-073878

(51) Int. Cl.
*B01J 21/04* (2006.01)
*B01J 23/44* (2006.01)
(Continued)

(52) U.S. Cl.
CPC ......... *F01N 3/035* (2013.01); *B01D 46/2418* (2013.01); *B01D 53/944* (2013.01); *B01D 53/9454* (2013.01); *B01J 21/04* (2013.01); *B01J 23/44* (2013.01); *B01J 35/0006* (2013.01); *B01J 35/04* (2013.01); *B01J 37/0219* (2013.01); *F01N 3/021* (2013.01); *F01N 3/0222* (2013.01); *B01D 2255/104* (2013.01); *B01D 2255/1021* (2013.01); *B01D 2255/1023* (2013.01); *B01D 2255/1025* (2013.01); *B01D 2255/1026* (2013.01); *B01D 2255/202* (2013.01); *B01D 2255/204* (2013.01); *B01D 2255/206* (2013.01); *B01D 2255/2022* (2013.01); *B01D 2255/2027* (2013.01); *B01D 2255/2042* (2013.01); *B01D 2255/2045* (2013.01);
(Continued)

(58) Field of Classification Search
CPC . B01L 21/04; B01J 23/44; B01J 35/04; F01N 3/0222; F01N 3/035; B01D 46/2418
See application file for complete search history.

(56) References Cited

U.S. PATENT DOCUMENTS 5,162,287 A * 11/1992 Yoshimoto ........... B01D 53/944
                                                              423/215.5
7,348,289 B2 * 3/2008 Ichikawa ............. B01D 53/885
                                                              502/174
(Continued)

FOREIGN PATENT DOCUMENTS

DE   10247946 A1   4/2004
EP    1364706 A1  11/2003
(Continued)

*Primary Examiner* — Cam N. Nguyen
(74) *Attorney, Agent, or Firm* — Gary D. Mangels

(57) ABSTRACT

Provided is an exhaust gas purification filter including a substrate comprising a plurality of porous partitions, wherein the partitions form an exhaust gas flow path, a porous catalytic layer is provided on the partitions and the catalytic layer having a thickness of 10 μm or greater is provided over at least 20% of the total length of the partitions in the lengthwise direction thereof, and the catalytic layer having a thickness of 10 μm or greater is not present on the partitions 15 mm from an outflow side.

13 Claims, 1 Drawing Sheet

(51) Int. Cl.
  *B01J 35/04* (2006.01)
  *F01N 3/022* (2006.01)
  *F01N 3/035* (2006.01)
  *B01D 46/24* (2006.01)
  *B01J 35/00* (2006.01)
  *B01J 37/02* (2006.01)
  *B01D 53/94* (2006.01)
  *F01N 3/021* (2006.01)

(52) U.S. Cl.
  CPC ........... *B01D 2255/2047* (2013.01); *B01D 2255/2063* (2013.01); *B01D 2255/2065* (2013.01); *B01D 2255/2092* (2013.01); *B01D 2255/20715* (2013.01); *B01D 2255/20738* (2013.01); *B01D 2255/20792* (2013.01); *B01D 2255/908* (2013.01); *B01D 2255/9155* (2013.01); *B01D 2255/9202* (2013.01); *B01D 2255/9205* (2013.01); *F01N 2330/06* (2013.01); *F01N 2510/0682* (2013.01); *Y02T 10/22* (2013.01)

(56) References Cited

U.S. PATENT DOCUMENTS

| | | | | |
|---|---|---|---|---|
| 7,449,427 B2 * | 11/2008 | Ohno | ............... | B01D 46/2429 156/89.22 |
| 7,540,898 B2 * | 6/2009 | Oshimi | ............... | B01D 46/2429 502/439 |
| 7,695,798 B2 * | 4/2010 | Miwa | ............... | B01J 23/63 428/116 |
| 8,093,173 B2 * | 1/2012 | Miyairi | ............... | B01D 46/2425 429/116 |
| 8,133,841 B2 * | 3/2012 | Noda | ............... | B01D 46/2429 422/177 |
| 8,603,942 B2 * | 12/2013 | Goto | ............... | B01D 46/2429 502/100 |
| 8,609,581 B2 * | 12/2013 | Miyairi | ............... | B01D 46/2451 422/171 |
| 9,006,138 B2 * | 4/2015 | Goto | ............... | B01D 46/2429 502/439 |
| 2006/0008396 A1 | 1/2006 | Wursthorn et al. | | |
| 2006/0014636 A1 * | 1/2006 | Ichikawa | ............... | B01D 53/885 502/243 |
| 2006/0057046 A1 | 3/2006 | Punke et al. | | |
| 2007/0049492 A1 * | 3/2007 | Miyairi | ............... | B01J 23/63 502/439 |
| 2008/0260599 A1 | 10/2008 | Ohno et al. | | |
| 2017/0304773 A1 | 10/2017 | Onoe et al. | | |
| 2017/0306823 A1 | 10/2017 | Onoe et al. | | |

FOREIGN PATENT DOCUMENTS

| | | |
|---|---|---|
| EP | 1657410 A2 | 5/2006 |
| EP | 2108448 A2 | 10/2009 |
| EP | 2236188 A1 | 10/2010 |
| EP | 2236783 A1 | 10/2010 |
| EP | 2239036 A1 | 10/2010 |
| EP | 3001000 A1 | 3/2016 |
| EP | 3081777 A1 | 10/2016 |
| EP | 3254758 A1 | 12/2017 |
| JP | 2002191988 A | 7/2002 |
| JP | 2002253968 A | 9/2002 |
| JP | 2009112907 A | 5/2009 |
| JP | 2108447 A2 | 10/2009 |
| JP | 2010069471 A | 4/2010 |
| JP | 2010227743 | 10/2010 |
| JP | 2339135 A1 | 6/2011 |
| WO | 2016133086 A1 | 8/2016 |
| WO | 2017001829 A1 | 1/2017 |
| WO | 2016060048 A1 | 7/2017 |
| WO | 2016060049 A1 | 7/2017 |

* cited by examiner

[Fig. 1]
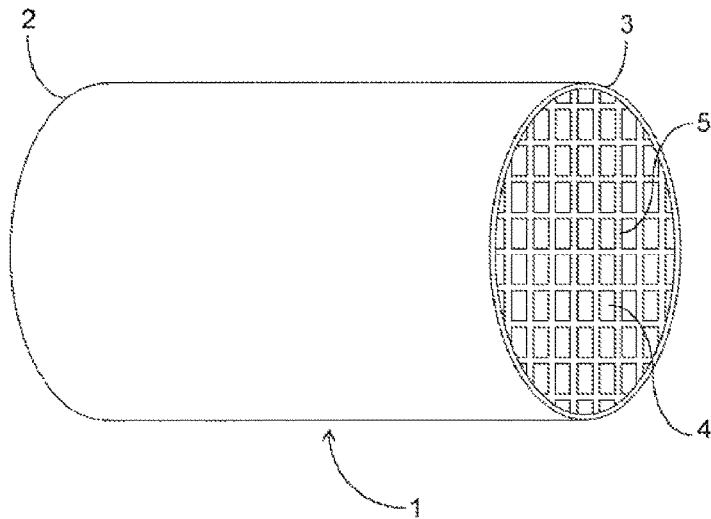
[Fig. 2]
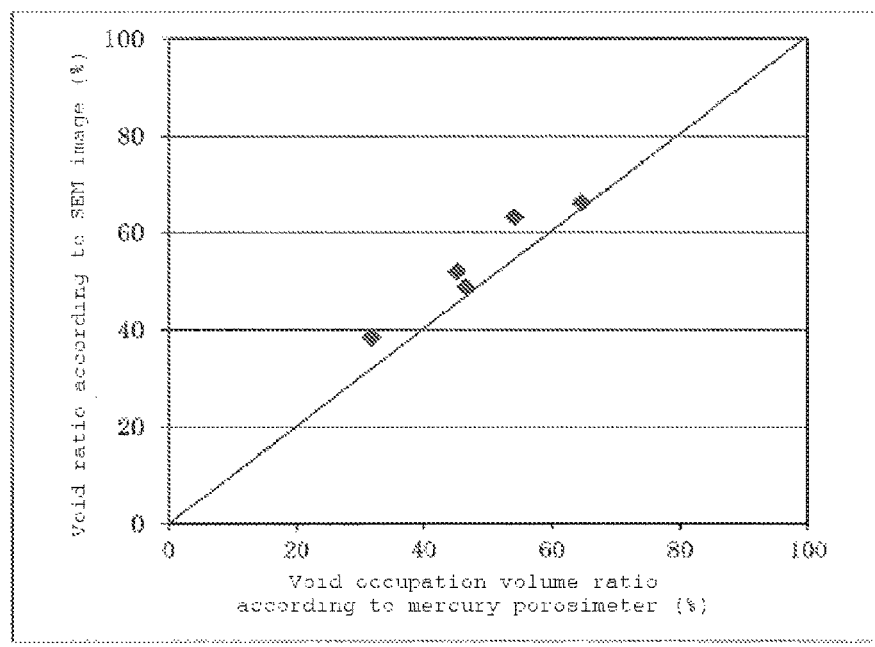

EXHAUST GAS PURIFICATION FILTER

CROSS-REFERENCE TO RELATED APPLICATIONS

This application claims priority to JP Patent Application No. 2016-073878, filed on Apr. 1, 2016, which is incorporated herein by reference.

TECHNICAL FIELD

The present invention relates to an exhaust gas purification filter.

PRIOR ART

Particulate matter (PM) is contained in exhaust gas discharged from fuel-burning combustion engines, especially from high-pressure fuel injection internal combustion engines. PM comprises: a component (e.g., a carbon-based substance) including soot and other carbon atoms produced by fuel combustion; a soluble organic component (referred to below, as appropriate, as "SOF") comprising unburned fuel (hydrocarbons) or unburned oil; and trace amounts of sulfates. PM is known as a substance which contaminates the atmosphere and has an adverse effect on plant and animal life, and reducing PM is becoming an important issue in the automotive industry at the present time.

For this reason, methods for trapping PM by means of a diesel particulate filter (DPF) are currently being developed as methods for reducing PM. However, there are limits to the amount of PM which can be trapped by a DPF, and the trapped PM has to be removed using external energy etc. This is therefore unsuitable for continuous treatment of exhaust gas and requires the installation of an external device, so there are problems in terms of cost and also an increase in the size of an exhaust gas treatment device, among other things.

Furthermore, a method for treating SOF, hydrocarbons and carbon monoxide in exhaust gas by means of an exhaust gas catalyst (oxidation catalyst) has been proposed. In general, exhaust gas catalysts are prepared for the most part by forming a catalyst component slurry and uniformly soaking a support in this slurry and then baking the support. Consequently, it has been found that when the exhaust gas flows into the catalyst component (catalytic layer) there is a reduction in the gas diffusion properties of the exhaust gas (hydrocarbon gas having a long carbon chain in particular), and as a result the capacity to purify the exhaust gas cannot be adequately demonstrated. Furthermore, a porous structure is generally used for the support for holding the catalytic layer, but the pore size may produce a reduction in the exhaust gas removal rate due to a limitation on exhaust gas diffusion under large space velocity conditions.

Patent Document 1 and Patent Document 2, for example, propose a NOx occlusion and reduction catalyst in which the exhaust gas diffusion properties are improved so as to improve the NOx purification efficiency, by supporting a NOx occluding agent and a precious metal on a coating layer comprising a porous structure provided with pores having a specific size.

PRIOR ART DOCUMENTS

Patent Documents

[Patent Document 1] JP 2002-191988 A
[Patent Document 2] JP 2002-253968 A

SUMMARY OF THE INVENTION

The inventors of the present invention discovered a configuration for an exhaust gas purification filter which makes it possible to achieve efficient treatment of particulate matter in exhaust gas. The present invention was devised against this background, and the aim thereof lies in providing an exhaust gas purification filter in which pressure loss hysteresis occurring when PM is repeatedly regenerated is improved, and particulate matter in exhaust gas can be efficiently treated. A further aim of the present invention lies in providing the structure of the abovementioned exhaust gas purification filter and a method for producing same.

The present invention provides an exhaust gas purification filter including a substrate comprising a plurality of porous partitions, wherein the partitions form an exhaust gas flow path, a porous catalytic layer is provided on the partitions and the catalytic layer having a thickness of 10 μm or greater is provided over at least 20% of the total length of the partitions in the lengthwise direction thereof, and the catalytic layer having a thickness of 10 μm or greater is not present on the partitions 15 mm from an outflow side.

According to a mode of the present invention, the application amount of catalyst component forming part of the catalytic layer varies according to the specific gravity of the catalyst component and the pore volume in the catalytic layer.

According to a mode of the present invention, the mean diameter of pores formed by an organic pore-forming material in the catalytic layer is between 1 and 5 μm.

According to a mode of the present invention, the void ratio of the catalytic layer is no greater than 50%.

According to a mode of the present invention, a slurry including a catalyst component and an organic pore-forming material is applied in order to form the catalytic layer.

According to a mode of the present invention, the mean length/diameter ratio of the organic pore-forming material is 1.5 or less.

According to a mode of the present invention, the void ratio of the substrate partitions is between 40% and 60%.

According to a mode of the present invention, the mean diameter of the pores in the substrate partitions is between 10 μm and 20 μm.

According to a mode of the present invention, the catalyst component may include at least one of platinum and palladium, and may further include at least one of an alkali metal and a rare earth metal.

According to a mode of the present invention, the thickness of the catalytic layer is between 10 μm and 50 μm.

A mode of the present invention provides a method for producing the abovementioned exhaust gas purification filter, comprising a step in which a slurry including a catalyst component and an organic pore-forming material is applied in order to form pores in the catalytic layer.

According to a mode of the present invention, the mean length/diameter ratio of the organic pore-forming material is 1.5 or less in the method for producing the abovementioned exhaust gas purification filter.

The present invention makes it possible to provide a filter that does not impair performance in relation to PM trapping efficiency, and can also maintain CO and HC oxide treatment efficiency by means of a catalyst, while also enabling a shorter drying time when the exhaust gas purification filter is produced.

BRIEF DESCRIPTION OF THE FIGURES

FIG. 1 is a schematic diagram to illustrate the exhaust gas purification filter according to a mode of embodiment of the present invention; and FIG. 2 is a graph showing the correlation between void ratio obtained from an SEM image and void ratio obtained from measurement results of a mercury porosimeter.

MODE OF EMBODIMENT OF THE INVENTION

A mode of embodiment of the present invention will be described below with reference to the figures but the present invention is obviously not limited by the mode of embodiment.

(Mode of Embodiment 1)

A feature of the exhaust gas purification filter according to this mode of embodiment lies in the fact that said exhaust gas purification filter includes a substrate comprising a plurality of porous partitions, the partitions form an exhaust gas flow path, a porous catalytic layer formed by an organic pore-forming material is provided on the partitions and the catalytic layer having a thickness of 10 μm or greater is provided over at least 20% of the total length of the partitions in the lengthwise direction thereof, and the catalytic layer having a thickness of 10 μm or greater is not present on a gas inflow-side partition 15 mm from an outflow side.

The exhaust gas purification filter according to this mode of embodiment restricts deep PM filtration by virtue of the fact that it is coated (on-wall coated) with a catalytic layer having a constant thickness or greater and comprising a suitable porous structure, and "pressure loss hysteresis" from repeated PM deposition and regeneration can be improved.

In terms of an exhaust gas purification filter, it is thus possible to restrict increases in pressure loss accompanying PM deposition, and it is also possible to detect a more suitable regeneration timing when increased pressure loss serves as a trigger for deposited PM regeneration treatment.

As shown in FIG. 1, the exhaust gas purification filter according to this mode of embodiment includes a substrate 1, and a catalytic substance (not depicted) provided inside the substrate 1, said substrate 1 comprising a plurality of cells 4 that form a gas (exhaust gas) flow path and have a gas inflow-side end 2 and outflow-side end 3, and a plurality of porous partitions 5 that define the cells 4. A porous catalytic layer (not depicted) is provided on the partitions 5.

The substrate 1 supports the catalytic substance and serves to form an exhaust gas flow path; the substrate is preferably durable so that as far as possible there is no reduction in combustion efficiency in a connected internal combustion engine caused by pressure loss. There is no particular limitation as to the porous material forming the substrate 1 as long as pores are provided at least in the partitions 5, but a porous ceramic material is preferably used.

Preferred materials for the substrate 1 include a cordierite ceramic comprising three components, namely aluminium oxide ($Al_2O_3$: alumina), silicon dioxide ($SiO_2$: silica) and magnesium oxide (MgO); silicon carbide and aluminium titanate. By using these materials together with the organic pore-forming material, it is possible to set the porosity of the partitions 5 etc. in the substrate 1 in a preferred range.

A honeycomb shape comprising the abovementioned materials is preferred as the substrate 1. A honeycomb-shaped filter includes a plurality of cells forming a gas flow path, but there is no particular limitation as to the cross-sectional shape of the cells and a grid-like mesh is feasible, as shown in FIG. 1, or a hexagonal shape is equally feasible, but there is no restriction as to the shape thereof. Alternatively, what is known as an asymmetrical cell structure having cells of different sizes at an inlet and outlet may be used.

There is no limitation as to the structure of the substrate 1 in the exhaust gas purification filter according to this mode of embodiment, but the substrate comprises at least the gas inflow-side end 2 and outflow-side end 3. Furthermore, the substrate 1 comprises at least the plurality of cells 4 forming the gas flow path, and the plurality of porous partitions 5 defining said cells 4.

The plurality of cells 4 in the exhaust gas purification filter according to this mode of embodiment are alternately sealed at the inlets/outlets thereof at the ends of at least some of the cells 4. By adopting this kind of configuration, exhaust gas can pass efficiently through the flow path and particulate matter in the exhaust gas can be efficiently treated.

The exhaust gas purification filter according to this mode of embodiment more preferably employs a substrate having a configuration such as that described above, but the substrate supporting the catalytic substance is not limited to the abovementioned configurations.

The porous catalytic layer is provided on the partitions of the exhaust gas purification filter according to this mode of embodiment, said catalytic layer having a thickness of 10 μm or greater being provided over at least 20% of the total length of the partitions in the lengthwise direction thereof, while the catalytic layer having a thickness of 10 μm or greater is not present on the gas inflow-side partitions 15 mm from the outflow side.

The catalytic layer having a thickness of 10 μm or greater more preferably constitutes at least 50% (excluding 15 mm from the outlet) of the total length of the partitions in the lengthwise direction thereof, from the point of view of reducing pressure loss hysteresis. Furthermore, it is preferable for a high-concentration precious metal component also to be present from the inlet portion in an amount of less than 50%, from the point of view of improving catalyst oxidation activity.

More preferably, the catalytic layer having a thickness of 10 μm or greater is not present on the gas inflow-side partitions of the inlet cells within 15 mm of the outflow side. Furthermore, the thickness of the catalytic layer on the partitions 15 mm from the outflow side is more preferably either between 10 and 40 μm or distributed in an in-wall state.

For example, when a range of 10 mm from the outflow side is used for sealing plugs, the catalytic layer is preferably not provided in a range of less than 5 mm from the ends of the plugs.

Coating 100% of the total length of the catalytic layer having a constant thickness is intrinsically advantageous in view of a DPF function, but this advantage can still be maintained to a certain extent if a partially uncoated portion is present. Furthermore, if an on-wall layer formed using a wet slurry is shortened, it is possible to shorten the time taken to dry moisture filling the pores in the partitions, which makes it possible to improve producibility. It is also possible to reduce pressure loss in terms of air circulation.

For example, if the total length (100%) of the partitions is coated with wet slurry, moisture fills the inside of the partitions, so ventilated drying is not possible until a water film has ruptured, so the drying time increases and this is a problem in terms of producibility. With the exhaust gas purification filter according to this mode of embodiment, however, the catalytic layer having a thickness of 10 μm or greater is not applied over the total length of 100%, so ventilated drying is possible directly after coating and it is possible to resolve said problem.

The exhaust gas purification filter according to this mode of embodiment has the configuration described above, and therefore it is possible to overcome production drawbacks while imparting the effect of an on-wall catalytic layer.

Furthermore, it is possible to enhance the gas dispersibility of the exhaust gas by virtue of the fact that the catalytic layer has pores formed by means of the organic pore-forming material, and as a result it is possible for the exhaust gas catalyst to perform efficient oxidation treatment of gaseous components such as CO and HC.

"Pores formed by means of the organic pore-forming material" as referred to in the exhaust gas purification filter according to this mode of embodiment indicate that voids are present inside, on the surface of, and at the interface etc. of the catalytic layer and the partitions. There is no particular limitation as to the shape of the "pores", and a hole shape, spherical shape, elliptical shape, prism shape, through-path or any similar shape is feasible, but preferably L/D<1.5.

The thickness of the catalytic layer in the portion of the exhaust gas purification filter according to this mode of embodiment having a thickness of 10 μm or greater is between 10 μm and 50 μm. The thickness of the catalytic layer in the portion having a thickness of 10 μm or greater is more preferably between 10 and 20 μm.

That is to say, a catalytic layer having a thickness of between 10 and 20 μm is preferred for reasons of reduced pressure loss and formation of an on-wall PM-trapping layer, and 50% or more (excluding a range of 15 mm from the outflow-side end) of the total length of the partitions in the lengthwise direction thereof is preferably coated from the point of view of reducing pressure loss hysteresis. Furthermore, less than 50% from the inflow-side end is preferably coated from the point of view of improving catalyst oxidation activity.

Specifically, the catalytic layer preferably includes a precious metal component such as platinum or palladium; a metal oxide such as alumina, silica or titania or a composite oxide thereof, or a component in which a rare earth element has been added thereto, such as ceria; and a Ba, Mn, Cu or OSC material and/or an alkali metal such as K or Cs serving as an auxiliary catalyst.

More preferably, the catalytic layer comprises a precious metal, a composite oxide having alumina as the main component serving as a support material for the precious metal, and an OSC (oxygen storage) material serving as a PM combustion catalyst.

The catalyst component which is used has the feature of catalysing the combustion of particulate matter and oxygen in the exhaust gas, and also of catalysing nitric oxide in the exhaust gas to nitrogen dioxide, catalysing carbon monoxide to carbon dioxide, and catalysing hydrocarbons to carbon dioxide and water. Specific examples of this kind of catalyst component which may be cited are those selected from the group consisting of alkali metals, alkaline earth metals, transition elements and elements from groups 10 to 12 of the extended periodic table of the elements, and mixtures thereof.

Alkali metals which may be cited are selected from the group consisting of sodium (Na), potassium (K), caesium (Cs) and mixtures thereof, with potassium and caesium and mixtures thereof being preferred. Alkaline earth metals which may be cited are selected from the group consisting of magnesium, calcium, barium and mixtures thereof, with magnesium, barium and mixtures thereof being preferred.

Transition elements which may be cited are selected from the group consisting of zirconium, lanthanum, cerium, platinum, rhodium, ruthenium, palladium, iron, silver and mixtures thereof, with cerium, platinum, iron and mixtures thereof being preferred. Zinc may be cited as an element from group 12 of the extended periodic table of the elements. Elements from group 13 of the extended periodic table of the elements which may be cited are selected from the group consisting of aluminium, gallium, indium and mixtures thereof, with aluminium being preferred.

The catalyst component preferably also brings a function of oxidizing gaseous components in the exhaust gas. Catalyst components of this kind which may be cited belong to the precious metals and the base metals from among those mentioned above.

The catalyst component in the exhaust gas purification filter according to this mode of embodiment more preferably includes at least one of platinum and palladium, and at least one of an alkali metal and a rare earth element.

The weight ratio of platinum and palladium is more preferably at least 1:1 for the catalytic substance. By this means, it is possible to achieve an effect enabling restriction of thermal sintering (agglomeration) of a precious metal, in particular platinum, under an oxidizing atmosphere. Furthermore, platinum and palladium are preferably included at a ratio of between 2:1 and 5:1 from the point of view of sulfur tolerance.

The exhaust gas purification filter according to this mode of embodiment more preferably further includes, as a catalyst auxiliary, at least one material selected from the group consisting of an OSC material, an alkali metal and a perovskite material. The further inclusion of a PM combustion catalyst comprising this kind of transition metal group makes it possible to achieve an effect of promoting combustion of carbon-based substances.

Examples of oxygen storage materials which may be cited include materials comprising Ce, Pr, Zr and Nd. Among these, Ce is particularly preferably used for reasons of promoting combustion. Examples of alkali metals which may be cited include K, Cs and Mg. Among these, K and Cs are particularly preferably used for reasons of promoting combustion. Examples of perovskite materials which may be cited include $Bi_4Ti_3O_4$ (JP 2010-69471 A) and $Ce_{0.5}Bi_{0.1}Pr_{0.4}$ (JP 2009-112907 A).

The application amount of the catalyst component forming part of the catalytic layer of the exhaust gas purification filter according to this mode of embodiment is more preferably set at 40 g/L or less, taking the catalyst component as γ-alumina. The amount of catalyst applied is related to the actual formation of an on-wall catalytic layer, and also affects pressure loss characteristics. 40 g/L may be converted to approximately 0.7 $g/in^3$.

Furthermore, an on-wall layer cannot be adequately formed when the material used in order to impart the catalytic function is applied at 10 g/L or less. The amount of catalyst component applied is more preferably 30 g/L or less for reasons of being able to limit a large increase in pressure loss, but the minimum amount is also affected by the specific gravity and pore volume of the material used. For example, when γ-alumina having a pore volume of 0.7 ml/g is used, an application amount of 40 g/L or less is preferred, and when cerium oxide having a pore volume of 0.21 ml/g is applied, an application amount of approximately 200 g/L is preferred. These show that the optimum application amount varies according to the material forming the slurry.

A further catalyst auxiliary may be added to the exhaust gas purification filter according to this mode of embodiment.

Specific examples of catalyst auxiliaries are selected from the group consisting of aluminium oxide, cerium oxide, titanium oxide, zirconium oxide, silicon oxide, magnesium oxide and mixtures thereof, with magnesium oxide, cerium oxide, titanium oxide, zirconium oxide and silicon oxide being preferred. The catalyst auxiliary is added in an amount of 50-99% with respect to the total weight of the components forming the catalytic layer.

The mean diameter of the pores in the catalytic layer in the exhaust gas purification filter according to this mode of embodiment is more preferably between 1 and 5 μm. The mean diameter of the pores in the catalytic layer is more preferably between 2 and 5 μm for reasons of a balance between pressure loss and restricting deep filtration of PM particles.

The void ratio of the catalytic layer in the exhaust gas purification filter according to this mode of embodiment is more preferably no greater than 50%. The void ratio of the catalytic layer is more preferably between 50 and 30% for reasons of pressure loss and of maintaining the mechanical strength of the on-wall layer.

The slurry including the catalyst component and the organic pore-forming material is more preferably mixed and applied in order to form the catalytic layer as an on-wall structure and in order to form pores in the catalytic layer of the exhaust gas purification filter according to this mode of embodiment.

There are several methods for on-wall coating of the catalyst. One such method employs solid particles which are larger than the pores in the partitions. It is possible to restrict the penetration of catalyst particles into the pores in the partitions by means of a pore-forming material having large particles which also serves as the catalyst solid content. Furthermore, this pore-forming material also contributes to reducing pressure loss in the on-wall catalytic layer.

The particle size of the pore-forming material is preferably between 1 and 5 μm, and more preferably between 2 and 5 μm in order to prevent deep filtration in the actual voids formed.

Specific examples of means for providing voids in the catalytic layer which may be cited include a means by which an exhaust gas catalyst component and a pore-forming material are added to and stirred in a medium (e.g., water) to prepare a slurry which is then supported on a support and baked in order to combust and decompose the forming agent. The forming agent can therefore preferably be removed by combustion during the baking process.

Any type of forming agent can be used provided that it causes the formation of voids, and materials having the same or different shapes, types or sizes etc. can be used. A forming material which is spherical or cylindrical etc. and can be thermally decomposed or combusted is preferred. An organic pore-forming material is more preferably used as the forming agent.

An organic pore-forming material can be advantageously used provided that it is a combustible material having a specific gravity at the same level as that of a slurry aqueous solution. This is because the organic pore-forming material does not readily form a uniform dispersed state with other materials in the aqueous solution if the specific gravity thereof is excessively low or excessively high.

Specific examples of this kind of forming agent which may be cited include: foaming agents, surfactants, foamable synthetic resins, activated carbon, graphite powder and pulp powder. Specific examples of foaming agents which may be cited include $La_2(CO_3)_3$, $Al_2(CO)_3$, and $Ce_2(CO)_3$, and the same elements as in the exhaust gas catalyst component are preferably included. Specific examples of surfactants which may be cited include anionic surfactants such as sulfonic acid surfactants and carbonic acid surfactants; cationic surfactants such as amine surfactants; and amphoteric surfactants such as fatty acid ester surfactants. Foamable synthetic resins and the like which may be cited include polyurethane-based, polystyrene-based (e.g., polystyrene), polyethylene-based, polyester-based, and polyacrylic-based (e.g., polymethyl methacrylate) synthetic resins.

When the organic pore-forming material is used, the mean length/diameter ratio of the organic pore-forming material is preferably 1.5 or less. The spheres of spherical particles generally make point contact and although this is believed to produce poor void communication, results up until now show that the advantages can be maintained. It is believed that setting L/D close to spherical facilitates predicting the amount of penetration into the pores in the partitions due to differences in the orientation of the pore-forming material, enabling the usage amount to be set more reliably.

A more preferred example of an organic pore-forming material is a polymer such as a polylactic acid polymer.

The void ratio of the pores in the partitions in the exhaust gas purification filter according to this mode of embodiment is preferably between 40% and 60%. The void ratio of the pores in the partitions is more preferably between 40 and 55% from the point of view of compatibility between reducing pressure loss and PM trapping performance.

The mean diameter of the pores in the partitions in the exhaust gas purification filter according to this mode of embodiment is preferably between 10 μm and 20 μm. The mean diameter of the pores in the partitions is preferably 10 μm or greater from the point of view of DPF pressure loss and is preferably 20 μm or less because this provides a high PM trapping efficiency from the outset. The mean diameter of the pores is more preferably between 10 and 15 μm.

The form of the pores and the void ratio of the catalytic substance in the abovementioned mode of embodiment can be obtained using an SEM (scanning electron microscope)/EPMA (electron probe microanalyser). For example, the pore area (A) of the substrate before application of the catalytic substance can be obtained by image processing in a field of view magnified between 150 and 500 times by means of an SEM/EPMA. Furthermore, the pore area (B) after application of the catalyst can also be obtained by the same method. Furthermore, the area of the substrate portion is obtained by means of image processing using the same two-dimensional method, which makes it possible to calculate the relative ratio of the pore area of holes in the substrate 1 and the occupied area ratio.

Furthermore, the mercury intrusion method is generally used as the method for measuring the three-dimensional pore structure volume, and the result of the correlation between that method and the abovementioned image processing method is as shown in FIG. 2; there is a correlation between the two-dimensional void ratio (ratio of occupied area) obtained from the SEM image and the void occupation volume ratio obtained from the measurement results using a mercury porosimeter, which constitutes three-dimensional data.

A compositional image at a magnification of 150 to 200 times is preferably used here in the SEM/EPMA method, and the occupied area can be obtained by separating the areas occupied by the substrate and the catalyst into individual colours using the RGB method, for example.

When the occupied area is obtained by image processing in the exhaust gas purification filter according to this mode of embodiment, the image is preferably binarized and a calculation is preferably made using an automatic mode or the like in order to prevent human error.

The exhaust gas purification filter according to the abovementioned mode of embodiment is used to purify exhaust gas and a device employing the exhaust gas purification filter according to the abovementioned mode of embodiment is preferably used in an exhaust system of an internal combustion engine, in particular a spark-ignition engine (e.g., a petrol engine) or a compression-ignition engine (e.g., a diesel engine).

Furthermore, these engines may be engines which burn fuel by adjusting the air-fuel ratio, and preferred specific examples thereof which may be cited include lean-burn engines, direct-injection engines, and preferably an engine combining these (i.e., a direct-injection lean-burn engine). A direct-ignition engine employs a fuel supply system which enables a higher compression ratio, improved combustion efficiency and also a reduction in exhaust gas. By combining this with a lean-burn engine, it is therefore possible to further improve combustion efficiency and reduce exhaust gas.

The exhaust gas purification filter according to this mode of embodiment is preferably used in an exhaust system of an internal combustion engine mounted in a conveyance vehicle or a machine etc. Specific examples of conveyance vehicles and machines which may be cited include: transportation vehicles such as motor vehicles, buses, trucks, dumper cars, diesel railcars, motorcycles, motorized bicycles, ships, tankers, motorboats, and aircraft; agricultural machines such as cultivators, tractors, combine harvesters, chainsaws, and timber carriers; aquatic and fishing machines such as fishing boats; timber working machines such as tank lorries, cranes, compressors, and excavators; and generators.

The exhaust gas purification filter according to this mode of embodiment may be installed for a start catalyst, an underfloor catalyst, or a manifold converter in a vehicle exhaust system, for example.

[Exemplary Embodiments]

Exemplary embodiments according to the present invention will be described below. The content of the present invention should not be interpreted as being limited by these exemplary embodiments.

[Example of Production of an Exhaust Gas Purification Filter Having a Catalytic Layer for Trapping PM on Partitions]

The DPF which was used was an SD082 produced by IBIDEN: diameter 143.8 mm×length 150.2 mm, mean pore size 12 μm, porosity 42%.

A wash coat (referred to below as a "WC") in which an organic pore-forming material was kneaded with a slurry containing alumina as the main component and also platinum and palladium was prepared and coated on the DPF by means of a filter coating apparatus in such a way that the amount of catalyst was 20 g/L. After drying at 100° C., the coated filter was baked for 1 hour at 500° C. Here, the organic pore-forming material which was used was a spherical material having an aspect ratio of 1:1 and comprising a polylactic acid polymer which was Landy PL-1000 (produced by Miyoshi Oil & Fat Co., Ltd.).

(Exemplary Embodiment 1 and Comparative Examples 1 and 2)

As shown in [Table 1], exhaust gas purification filters were produced with different lengths of catalytic layer on the partitions. The WC containing the organic pore-forming material was applied in such a way that the length thereof was 15 mm, 76 mm and 150 mm, and these lengths correspond to Exemplary Embodiment 1 and Comparative Examples 1 and 2, respectively. The location which was not coated with the WC containing the organic pore-forming material were coated using a WC that did not contain an organic pore-forming material. The amounts of platinum, palladium and WC per exhaust gas purification filter were the same.

It was clear that an exhaust gas purification filter in which the catalytic layer having a thickness of 10 μm or greater was applied over at least 20% of the total length of the partitions in the lengthwise direction thereof, and the catalytic layer having a thickness of 10 μm or greater was not present at a position 15 mm from the outflow side, dried in a shorter time in the slurry drying process, which is a consideration in mass production, and also had superior performance in terms of CO 50% conversion efficiency temperature, and also PM deposition pressure loss and PM deposition pressure loss hysteresis. The PM deposition pressure loss was measured under soot generation conditions of a gas flow rate of 240 kg/hr and a gas temperature of 250° C.

TABLE 1

| | Length of application of on-wall catalytic layer having a thickness of 10 μm or greater [mm] | Catalytic layer having a thickness of 10 μm or greater at a position 15 mm from outflow side | Time of slurry drying process [min] | CO 50% conversion efficiency temperature [° C.] | PM deposition pressure loss [kPa] | PM deposition pressure loss hysteresis (pressure loss difference with the same amount of soot accumulation after soot regeneration treatment) [kPa] |
|---|---|---|---|---|---|---|
| Ex. Emb. 2 | 76 | Not present | 10-15 | 240 | 7.0 | 0.1 or less |
| Comp. Ex. 1 | 15 | Not present | 5-10 | 255 | 7.4 | 0.6 |
| Comp. Ex. 2 | 152 | Present | 90-100 | 245 | 7.2 | 0.1 or less |

(Exemplary Embodiments 3-5)

Exhaust gas purification filters were produced in accordance with Exemplary Embodiment 1 with catalyst component application amounts of 35 g/L, 55 g/L and 5 g/L, and these correspond to Exemplary Embodiments 3, 4 and 5.

When the amount of catalyst component applied exceeded 40 g/L, as in Exemplary Embodiment 4, the thickness of the catalytic layer and the partitions increased and there was a deterioration in PM deposition pressure loss. Furthermore, when the amount of catalyst component applied was 10 g/L or less, as in Exemplary Embodiment 5, the thickness of the catalytic layer on the partitions decreased and the effect as an on-wall layer could not be demonstrated.

TABLE 2

| | Length of application of on-wall catalytic layer having a thickness of 10 μm or greater [mm] | Catalytic layer having a thickness of 10 μm or greater at a position 15 mm from outflow side | Amount of catalyst component applied [g/L] | Mean thickness of on-wall layer [μm] | PM deposition pressure loss [kPa] |
|---|---|---|---|---|---|
| Ex. Emb. 2 | 76 | Not present | 20 | 13 | 7.0 |
| Ex. Emb. 3 | 76 | Not present | 35 | 21 | 7.4 |
| Ex. Emb. 4 | 76 | Not present | 55 | 40 | 8.4 |
| Ex. Emb. 5 | 76 | Not present | 5 | 3 | 7.9 |

(Exemplary Embodiments 6 and 7)

In accordance with Exemplary Embodiment 2, irregular particles (corn starch) which were not spherical were used as the type (shape) of the organic pore-forming material in Exemplary Embodiment 6, and a melamine polymer (MC6000 (produced by Nissan Chemical Industries, Ltd.), spherical, L/D=1) was used in Exemplary Embodiment 7. A satisfactory catalytic layer could not be obtained on the partitions in either Exemplary Embodiment 6 or 7.

(Exemplary Embodiments 8 and 9)

In accordance with Exemplary Embodiment 2, exhaust gas purification filters in which the amount of organic pore-forming material added was changed to 4 g/L and 15 g/L were produced, and these correspond to Exemplary Embodiments 8 and 9. In [Table 4], the amount of organic pore-forming material added (g/L) is converted to the volume fraction (%) of the organic pore-forming material in the WC. A satisfactory catalytic layer could not be obtained on the partitions in either Exemplary Embodiment 8 or 9, and a state in which the void ratio could be defined was not achieved.

TABLE 3

| | Length of application of on-wall catalytic layer having a thickness of 10 μm or greater [mm] | Catalytic layer having a thickness of 10 μm or greater at a position 15 mm from outflow side | Type of organic pore-forming material | Shape/aspect ratio of organic pore-forming material | Formation of on-wall layer |
|---|---|---|---|---|---|
| Ex. Emb. 2 | 76 | Not present | Polylactic acid polymer | Spherical/1:1 | Satisfactory |
| Ex. Emb. 6 | 76 | Not present | Acrylic polymer | Elliptical/3:1 | Some of WC entered partitions |
| Ex. Emb. 7 | 76 | Not present | Melamine polymer | Spherical/1:1 | Could not be dispersed in slurry, uneven layer formed after coating |

TABLE 4

|  | Length of application of on-wall catalytic layer having a thickness of 10 μm or greater [mm] | Catalytic layer having a thickness of 10 μm or greater at a position 15 mm from outflow side | Type of organic pore-forming material | Volume fraction of organic pore-forming material in WC [%] | Void ratio of on-wall catalytic layer [%] | PM deposition pressure loss [kPa] |
|---|---|---|---|---|---|---|
| Ex. Emb. 2 | 76 | Not present | A | 46 | 48 | 7.0 |
| Ex. Emb. 8 | 76 | Not present | A | 24 | Could not be defined | 7.4 |
| Ex. Emb. 9 | 76 | Not present | A | 66 | Could not be defined | 8.4 |

The invention claimed is:

1. An exhaust gas purification filter comprising a substrate comprising:
a plurality of porous partitions, wherein the partitions form an exhaust gas flow path, wherein an on-wall porous catalytic layer comprising a catalyst component is provided on the partitions, the catalytic layer having a thickness of between 10 μm and 50 μm, wherein the mean diameter of pores in the catalytic layer is between 1 and 5 μm, the void ratio of the catalytic layer is no greater than 50%, the catalyst component is present in the layer at a loading of 10 to 40 g/L, and the catalytic layer is present-over at least 20% of the total length of the partitions in the lengthwise direction thereof, and
the catalytic layer having a thickness of between 10 μm and 50 μm is not present on the gas inflow-side partitions within 15 mm from an outflow side of the filter.

2. The exhaust gas purification filter according to claim 1, wherein the application amount of catalyst component forming part of the catalytic layer varies according to the specific gravity of the catalyst component and the pore volume in the catalytic layer.

3. The exhaust gas purification filter according to claim 1, wherein the mean diameter of the pores in the catalytic layer is between 2 and 5 μm.

4. The exhaust gas purification filter according to claim 1, wherein the void ratio of the catalytic layer is between 30 and 50%.

5. The exhaust gas purification filter according to claim 1, wherein the void ratio of the partitions is between 40% and 60%.

6. The exhaust gas purification filter according to claim 1, wherein the mean diameter of the pores in the partitions is between 10 μm and 20 μm.

7. The exhaust gas purification filter according to claim 1, wherein the catalyst component comprises at least one of platinum and palladium, and at least one of an alkali metal and a rare earth metal.

8. The exhaust gas purification filter according to claim 1, wherein the thickness of the catalytic layer is between 10 μm and 20 μm.

9. The exhaust gas purification filter according to claim 1, wherein the catalytic layer covers at least 50% (excluding 15 mm from the outlet) of the total length of the partitions in the lengthwise direction from the inlet.

10. The exhaust gas purification filter according to claim 1, wherein the catalytic layer covers less than 50% (excluding 15 mm from the outlet) of the total length of the partitions in the lengthwise direction from the inlet.

11. A method for producing an exhaust gas purification filter according to claim 1, the method comprising:
(a) applying a slurry comprising a catalyst component and an organic pore-forming material to a support
(b) forming pores in a catalytic layer; wherein the organic pore-forming material is a combustible material having a specific gravity at the same level as that of a slurry aqueous solution and particle size of the pore-forming material is between 1 and 5 μm, and
(c) providing voids in the catalytic layer.

12. The method for producing an exhaust gas purification filter according to claim 11, wherein the mean length/diameter ratio of the organic pore-forming material is 1.5 or less.

13. The method for producing an exhaust gas purification filter according to claim 11, wherein the step of providing voids in the catalytic layer is formed by heating the support comprising the slurry comprising a catalyst component and an organic pore-forming material to a support to decompose or combust the organic pore forming material.

* * * * *